(12) United States Patent
Miller et al.

(10) Patent No.: US 7,831,791 B2
(45) Date of Patent: Nov. 9, 2010

(54) METHOD OF ADDRESS SPACE LAYOUT RANDOMIZATION FOR WINDOWS OPERATING SYSTEMS

(75) Inventors: Matthew Miller, Seattle, WA (US); Ken Johnson, Overland Park, KS (US)

(73) Assignee: Wehnus, LLC, Overland Park, KS (US)

( * ) Notice: Subject to any disclaimer, the term of this patent is extended or adjusted under 35 U.S.C. 154(b) by 0 days.

(21) Appl. No.: 12/467,700

(22) Filed: May 18, 2009

(65) Prior Publication Data

US 2009/0254726 A1    Oct. 8, 2009

Related U.S. Application Data

(62) Division of application No. 11/464,749, filed on Aug. 15, 2006, now Pat. No. 7,546,430.

(60) Provisional application No. 60/595,896, filed on Aug. 15, 2005.

(51) Int. Cl.
*G06F 12/16* (2006.01)
*G06F 9/44* (2006.01)

(52) U.S. Cl. ................. 711/163; 711/153; 711/170; 712/244; 719/318

(58) Field of Classification Search .............. None
See application file for complete search history.

(56) References Cited

U.S. PATENT DOCUMENTS

| | | | |
|---|---|---|---|
| 6,735,761 B1* | 5/2004 | Ogasawara | 717/140 |
| 7,185,150 B1* | 2/2007 | Kogge | 711/147 |
| 7,240,186 B2* | 7/2007 | Bell et al. | 712/244 |
| 7,426,732 B2* | 9/2008 | Alverson et al. | 718/108 |
| 2007/0174560 A1* | 7/2007 | Kogge | 711/154 |
| 2007/0203882 A1* | 8/2007 | Koseki et al. | 707/2 |

OTHER PUBLICATIONS grsecurity, http://grsecurity.org/, dated Nov. 16, 2006.
Office Action for U.S. Appl. No. 11/464,749, Method of Address Space Layout Randomization for Windows Operating Systems, dated Sep. 4, 2008, 9 pages.

* cited by examiner

*Primary Examiner*—Jack A Lane
(74) *Attorney, Agent, or Firm*—Polsinelli Shughart PC

(57) ABSTRACT

A system and method for address space layout randomization ("ASLR") for a Windows operating system is disclosed. The address space layout includes one or more memory regions that are identified and then a particular implementation of the system randomizes the identified memory region in order to prevent any software vulnerabilities.

19 Claims, 14 Drawing Sheets

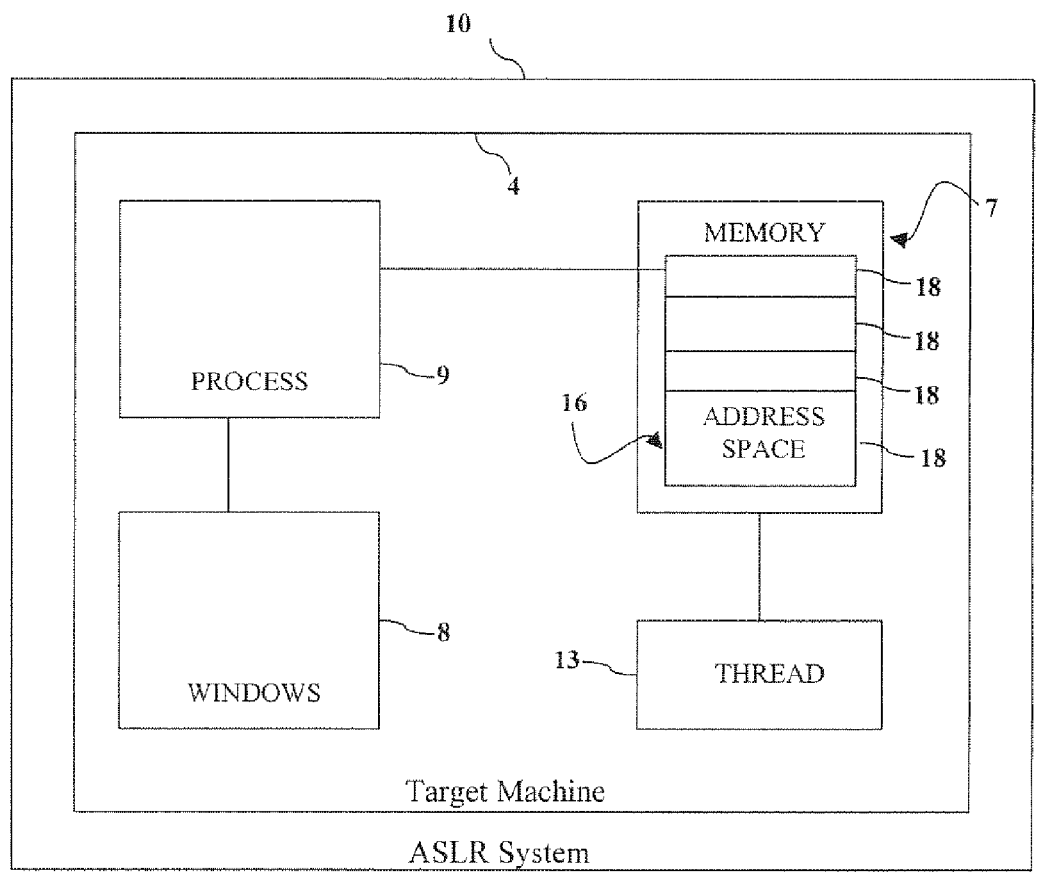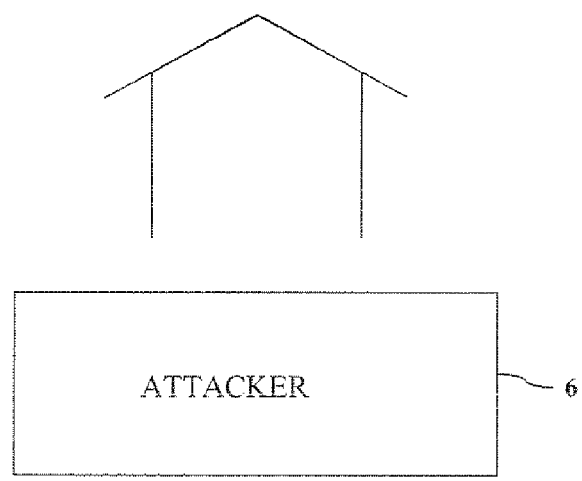
FIG. 1

METHOD OF ADDRESS SPACE LAYOUT RANDOMIZATION FOR WINDOWS OPERATING SYSTEMS

CROSS REFERENCE TO RELATED APPLICATIONS

This application is a divisional of prior application Ser. No. 11/464,749, filed Aug. 15, 2006, now U.S. Pat. No. 7,546,430 which claims priority from U.S. provisional patent application Ser. No. 60/595,896, filed Aug. 15, 2005, which is incorporated herein by reference in its entirety.

FIELD

The present document relates to a method of protecting an operating system from software vulnerabilities, and more particularly to a method of address space layout randomization for a Windows operating system.

BACKGROUND

There are a number of ways by which an attacker can execute arbitrary code on a target machine, such as a personal computer, in order to gain control of that target machine. However, a given attack vector must provide an attacker with the ability to either directly or indirectly alter the execution path of a software program or a process in a controllable and desired fashion such that the process can be altered to run software code supplied by the attacker in order to gain control of the target machine.

As such, the attacker must have some sort of knowledge about the address space layout of the process being attacked. Knowledge of the address space layout for a particular process allows an attacker to redirect execution to the attacker's controllable location in memory, thereby allowing an attacker to execute arbitrary code in a Windows operating system and gain control of the target machine.

An address space layout may include multiple segments such as stacks, heaps, memory mapped files, arbitrary memory allocations, executable image mapping, DLL image mappings, TEB(s) and a PEB. Stacks, heaps, memory mapped files, arbitrary memory allocations and executable image mappings are found in most common operating systems, while the PEB ("Process Environment Block") and the TEB ("Thread Environment Block") are memory region types unique to the Windows operating system.

To date, there have been a number of implementations that have tried to either partially or universally stop exploitation of software vulnerabilities, such as Address Space Layout Randomization ("ASLR"). ASLR is a term that is used to describe the action of making the address space layout for a particular process' virtual address space unpredictable, either wholly or in part. Although the means of implementing ASLR varies greatly depending on the particular platform, it usually involves randomizing certain types of memory allocations across the span of a process' execution.

The major benefit of ASLR over other approaches is that the impact on performance of the process incurred by randomization of the address space is negligible. ASLR also has the benefit of not breaking legacy applications that rely on writable memory regions remaining executable. In addition, ASLR is the only method that, when done in whole, can prevent every known method of exploitation that relies on knowing something about the address space of a target process.

However, there is a need in the art for an ASLR system for a Windows operating system in order to protect such an operating system from attack as well as mitigate a large class of vulnerabilities inherent in the Windows operating system. In addition, there is a need for an SEH overwrite protection for a Window operating system.

SUMMARY

In one embodiment a system for address space layout randomization may include an address space having one or more different types of memory regions, the ASLR system further including a means for identifying the type of memory region in the address space, and randomizing each type of memory region in the address space once said one more different types of memory regions are identified.

In another embodiment a method for randomizing one or more memory regions includes identifying whether the memory region is a file mapping and then determining whether the memory region is an image file if the memory region is a file mapping.

Implementation of the above embodiments may include one or more of the following features:

The system for address space layout randomization further includes one or more algorithms for randomizing a respective memory region, including the operation of selecting a randomized base address.

Identifying whether the memory region is a PEB or a TEB if the memory region is not a file mapping.

Identifying whether the memory region is a memory allocation if the memory region is not a PEB or a TEB.

Identifying whether the memory region is an image file if the memory region is a file mapping.

Randomizing the memory region if the memory region is a file mapping.

Randomizing the memory region if the memory region is either a PEB or a TEB.

Randomizing the memory region if the memory region is a memory allocation.

Randomizing the memory region if the memory region is an image file mapping.

The memory region may be a stack.
The memory region may be a heap.
The memory region may be an arbitrary file mapping.
The memory region may be an executable image mapping.
The memory region may be a DLL image mapping.
The memory region may be a TEB.
The memory region may be a PEB.

Additional objectives, advantages and novel features will be set forth in the description which follows or will become apparent to those skilled in the art upon examination of the drawings and detailed description which follows.

BRIEF DESCRIPTION OF THE DRAWINGS

FIG. 1 is a simplified block diagram illustrating the basic concept of an ASLR system;

Corresponding reference characters indicate corresponding elements among the several views. The headings used in the figures should not be interpreted to limit the scope of the figures.

DETAILED DESCRIPTION

Figure 2:
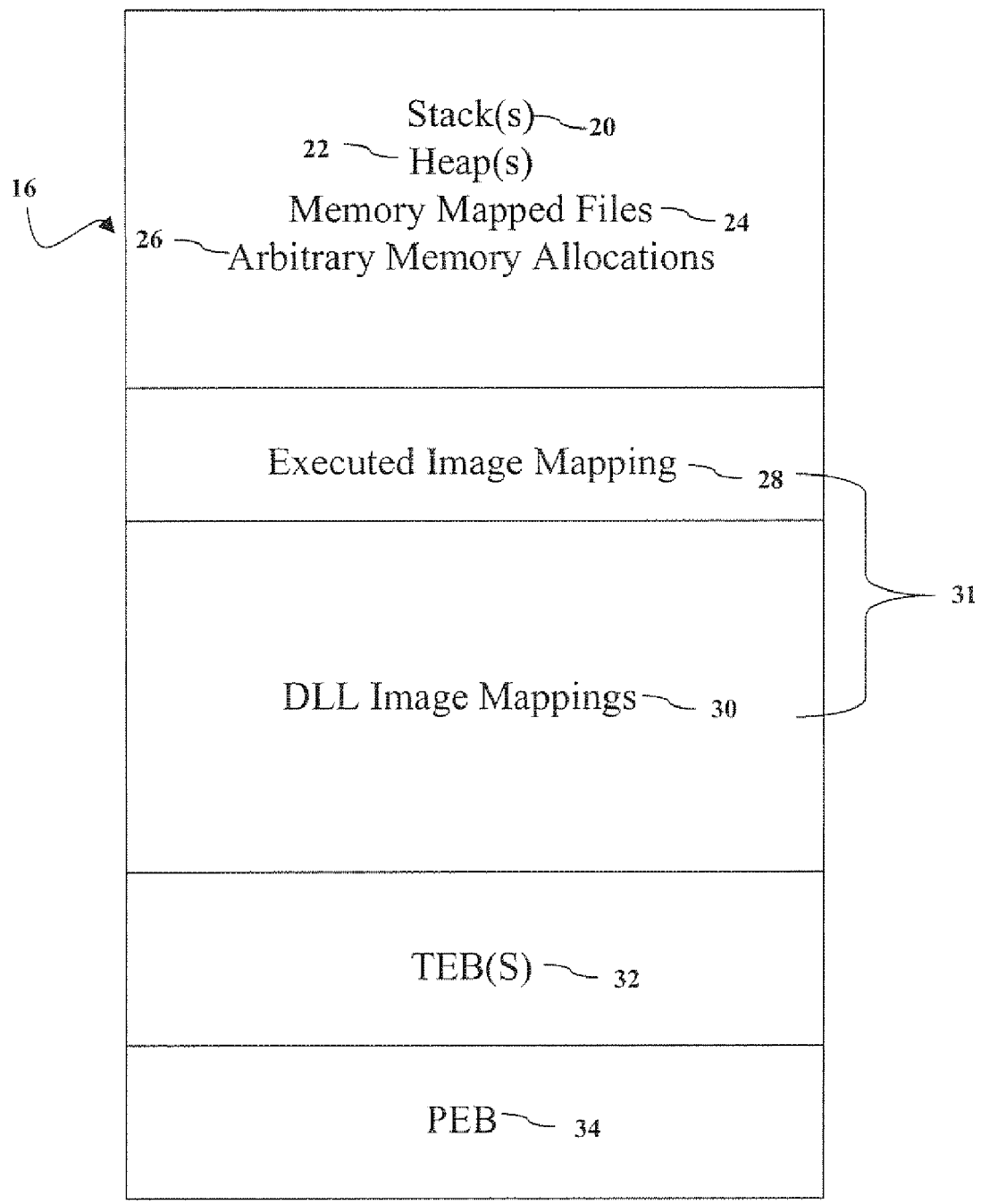
FIG. 2 is a simplified block diagram of an address space for a Windows operating system illustrating the various memory regions of the address space.

Referring to the drawings a system and method for implementing an address space layout randomization ("ASLR") is illustrated and generally indicated as 10 in FIG. 1. Referring to FIG. 1, the ASLR system 10 provides a means of protecting a target machine(s) 4 being run on a Windows operating system 8 ("Windows platform") from an attacker 6 seeking to execute arbitrary code on a process 9 being run on target machine 4. As discussed earlier, an attacker 6 may execute such arbitrary code on process 9 by exploiting software vulnerabilities inherent in an address space 16 found in memory 7 of a particular target machine 4.

Exploiting such software vulnerabilities requires that the attacker 6 have some knowledge about the layout of the address space 16 of the process 9 being attacked. In one implementation, a system and method for preventing execution of such arbitrary code by an attacker 6 includes randomizing different portions of the address space 16 in such a manner that an attacker 6 is prevented from running arbitrary code in order to directly or indirectly alter the execution path of process 9 in a controllable and desirable fashion.

As shown in FIG. 2, the address space 16 may include various memory regions 18 for a particular process 9. These memory regions 18 may include stack(s) 20, heap(s) 22, memory mapped files 24, arbitrary memory allocations 26, executable image mapping 28, DLL image mappings 30, TEB(s) 32 and a PEB 34. In particular, one or more implementations of ASLR system 10 will be used to randomize one or more memory regions 18 of the address space 16 in order to prevent a software vulnerability that could be exploited by the attacker 6.

As used herein, a stack 20 is used to store data and control information for one or more frames of execution associated with a given thread 13, while a heap 22 is used to store globally scoped data. Memory mapped files 24 are regions of memory 7 that are backed against a non-image file on disk (not shown) instead of Random Access Memory ("RAM"). Further, an arbitrary memory allocation 26 of the address space 16 is an allocation of a memory region 18 with RAM that the Windows platform 8 provides such as a heap 22, rather than as a file on a disk. The executable image mapping 28 is fundamentally the same as a DLL image mapping 30 and are collectively referred to as an image file mapping 31. Finally, a PEB 34 is used to store globally accessible control structures and variables that are used internally by Microsoft® during the course of a process' 9 execution, while the TEB 32 is used to store information about and for a given thread 13, such as error codes, thread 13 local storage, and other attributes unique to a single thread 13. As used herein, thread 13 may be defined as a sequence of instructions which may execute in parallel with other threads.

As shall be discussed in greater detail below, various implementations of the ASLR system 10 are adapted to randomize a respective memory region 18 of address space 16 in a manner that prevents exploitation of a software vulnerability. A general overview of the ASLR system 10 is discussed below followed by specific discussions related to various implementations of ASLR system 10 for randomizing each type of memory region 18.

Overview of ASLR System

Figure 3:
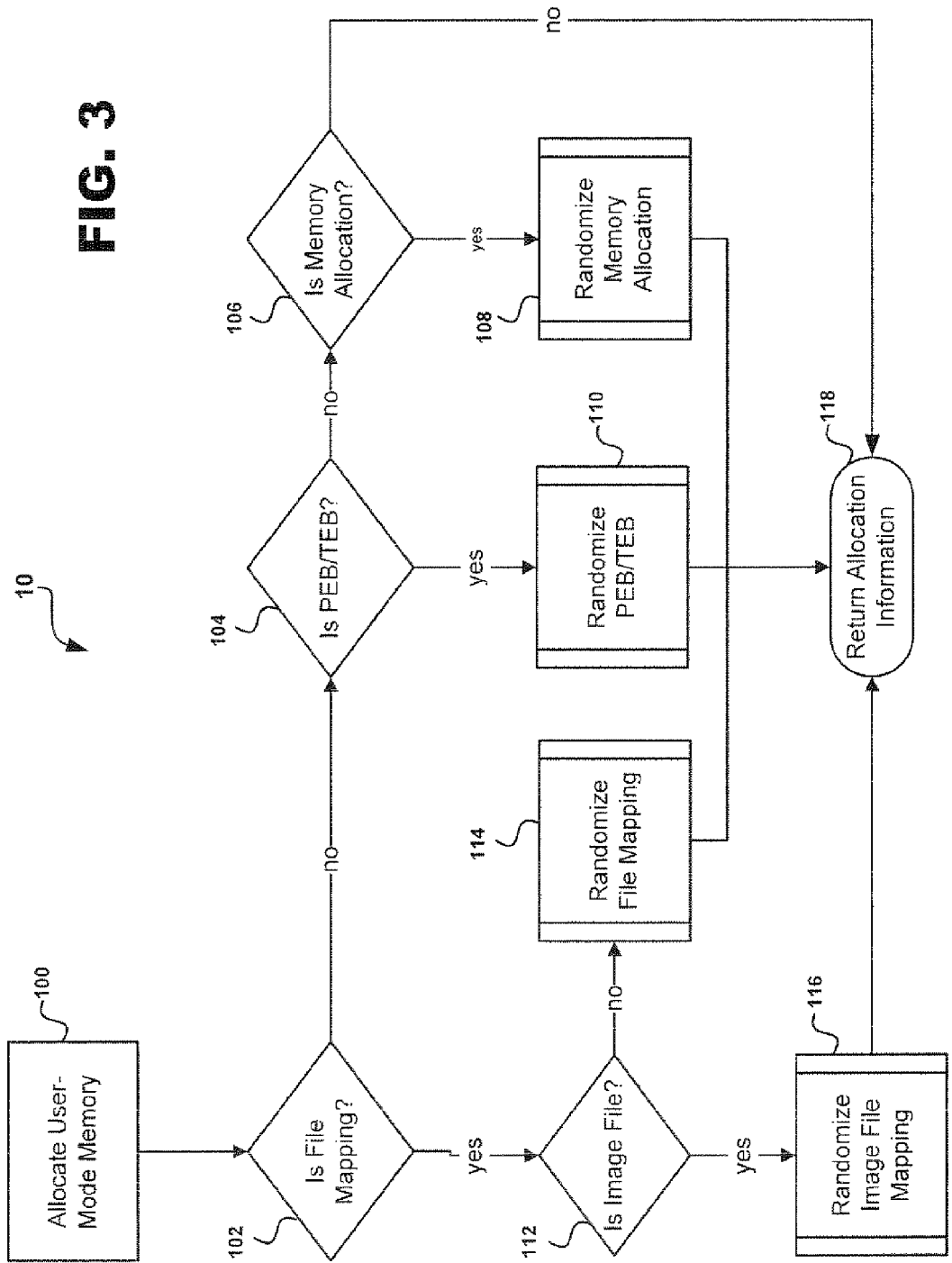
FIG. 3 is a flow chart illustrating a general overview of ASLR implementation for a Windows operating system.

Referring to FIG. 3, an overview of the steps taken by ASLR system 10 to randomize each respective memory region 18 of address space 16 is illustrated. At step 100, memory may be allocated by ASLR System 10 for a user mode process 9 through calls to ntdll!NtAllocateVirtualMemory and ndtll!NtmapViewOfSection. Once completed, the ASLR system 10 at decision point 102 must determine whether a particular memory region 18 is a file mapping 14 or not. If a particular memory region 18 is a file mapping 14, then the ASLR system 10 proceeds to decision point 104. If not, then ASLR system 10 proceeds to decision point 112.

At decision point 104 ASLR system 10 determines whether memory region 18 is a TEB 32 or PEB 34. If the memory region 18 is identified as either a TEB 32 or a PEB 34, then ASLR system 10 proceeds to execute subroutine 110 which randomizes the TEB 32 or PEB 34. If not, ASLR system 10 proceeds to decision point 106 which determines that the memory region 18 is an arbitrary memory allocation 28 and then executes a subroutine 108 which randomizes the arbitrary memory allocations 26. If the ASLR system 10 determines that the memory region is not an arbitrary memory allocation 26, then the system 10 proceeds to step 118 for return allocation information.

At decision point 112, the ASLR system 10 determines whether the memory region 18 is an image file mapping 31 or not. If the memory region 18 is not an image file mapping 31, then system 10 proceeds to execute subroutine 114 which randomizes the memory region 18 as a file mapping 14. If the memory region 18 is an image file mapping 31, then ASLR system 10 proceeds to execute subroutine 116 which randomizes the memory region 18 as an image file mapping 31. Once either subroutines 108, 110, 114 or 116 are executed and completed in such a manner that prevents exploitation of any software vulnerability, the ASLR system 10 proceeds to step 118 for return of allocation information.

Implementation of ASLR System for Randomizing Memory Allocation

The term memory allocation, as used herein, means a generic grouping of arbitrary purposed memory segments in a process 9, such as thread stacks 20 and heaps 22. The majority of memory allocations that are mapped into the address space 16 of process 9 over time are executed at the request of process 9, rather than being executed for the thread 9 by the kernel.

Figure 4:
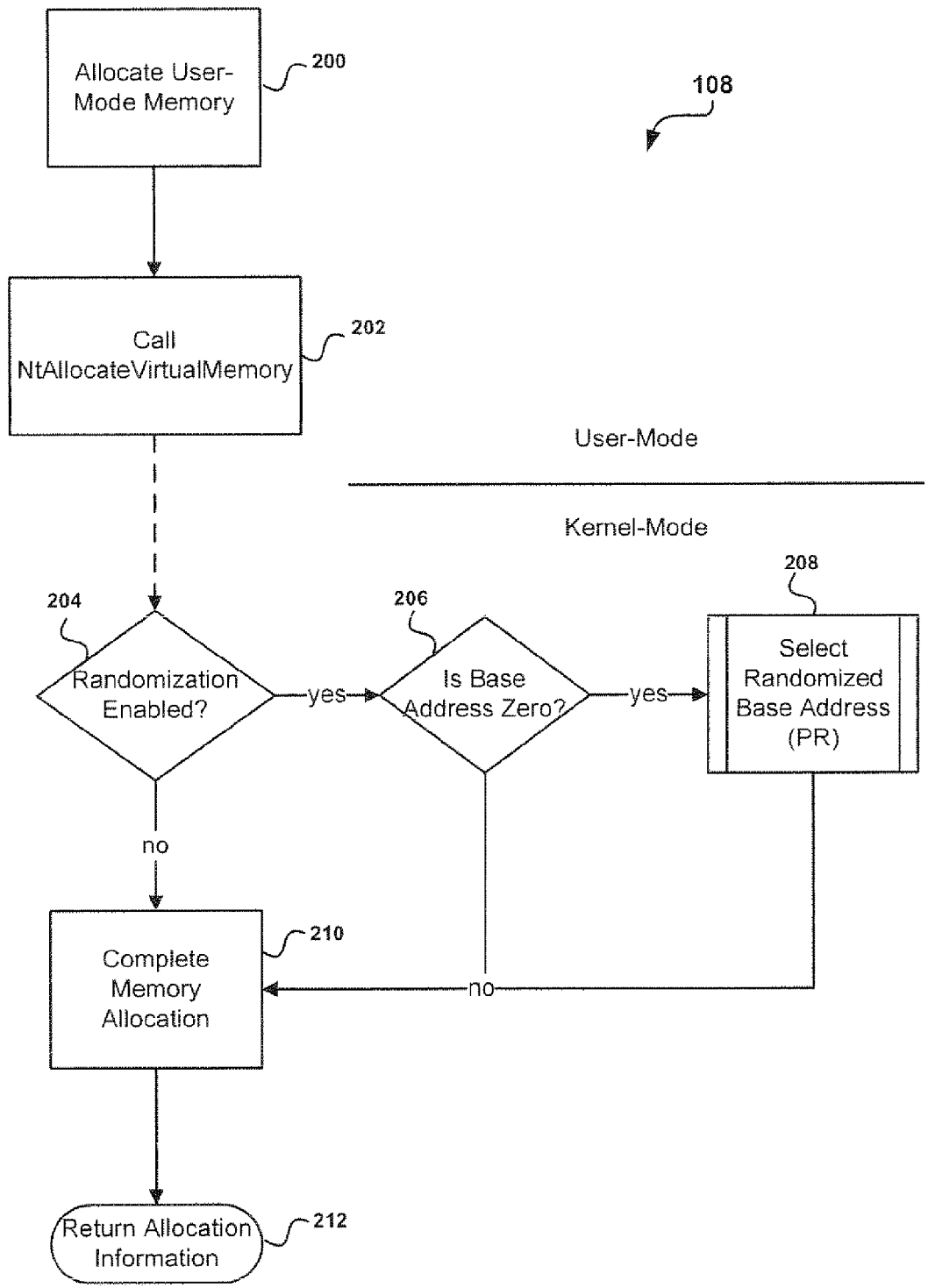
FIG. 4 is a flow chart illustrating an overview of one implementation of the ASLR system related to memory allocation memory region.

Referring to FIG. 4, the subroutine 108 for randomizing the arbitrary memory allocation memory region is illustrated. At step 200, memory may be allocated for a user mode. The ASLR System 10 proceeds to step 202 wherein an ntdll!NtAllocateVirtualMemory calls into the kernel (not shown) which is handled at nt!NtAllocateVirtualMemory that permits allocation of an arbitrarily sized memory region 18 at an arbitrary address (either fixed or dynamically chosen). Callers of NtAllocateVirtualMemory also have the ability to control the page protection and are able to specify the type of allocation to be performed, whether it be to commit pages to memory or to reserve such pages for future use.

At decision point 204, ASLR System 10 determines whether randomization is enabled or not. If the randomization is enabled, then at decision point 206 ASLR System 10 determines whether the base address of address space 16 is zero. If the randomization is not enabled, then at step 210 memory allocation is completed and ASLR System 10 proceeds to step 212 for return of allocation information.

However, if it is determined that the requested base address is zero, then the ASLR system 10 implements a subroutine 208 that selects a randomized base address using an algorithm. Once completed, the ASLR System 10 proceeds to steps 210 and 212 as described above. However, if the ASLR System 10 determines that the base address is not zero, then the System 10 proceeds directly to steps 210 and 212 and the allocation is completed.

In order to robustly implement randomization of memory allocations that are performed by way of nt!NtAllocateVirtualMemory, a kernel-mode driver must be implemented that layers between callers of nt!NtAllocateVirtualMemory and its implementation. This allows for catching allocations that are originally both in user-mode and kernel-mode.

Figure 8:
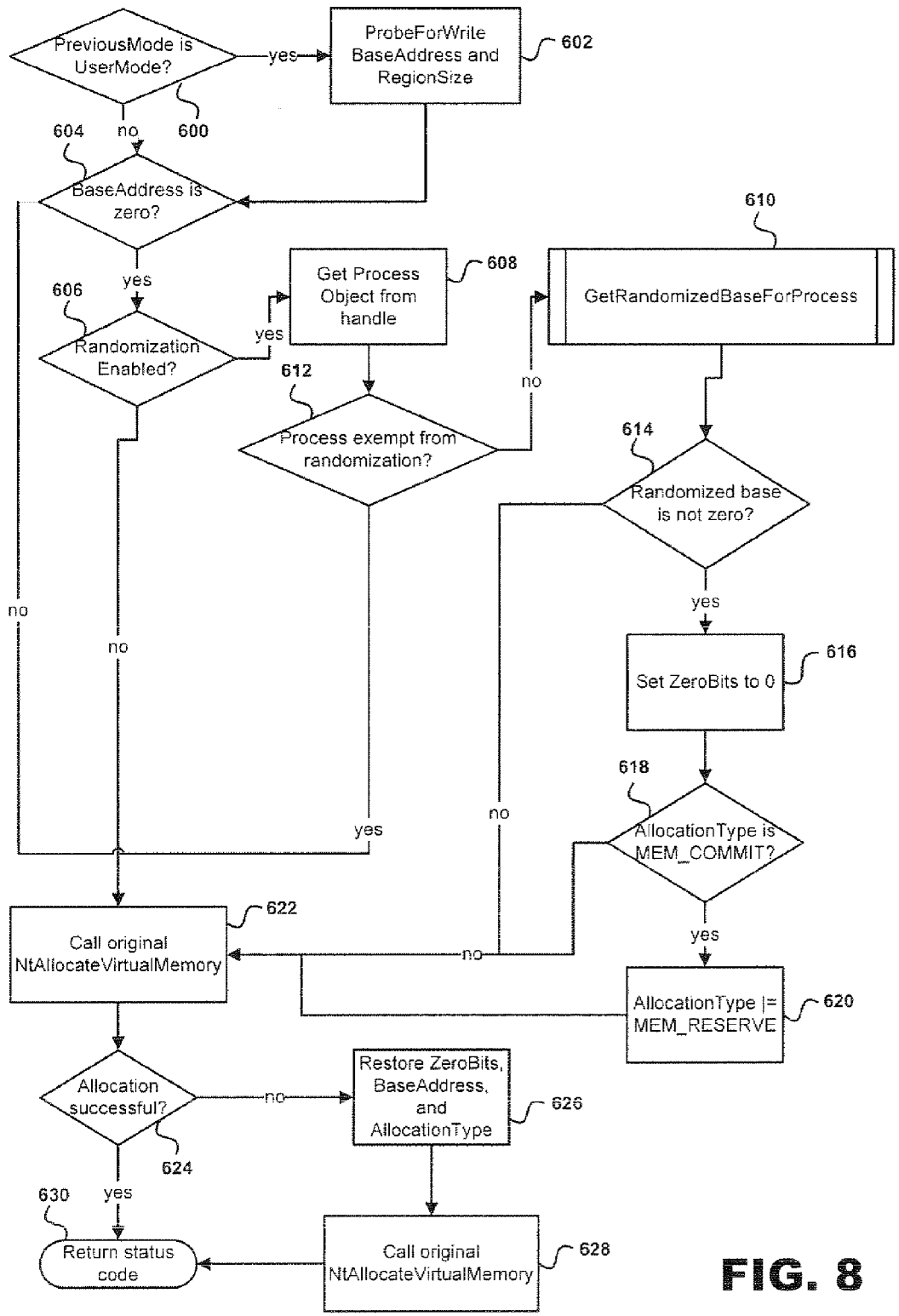
FIG. 8 is a flow chart illustrating another implementation of the ASLR system related to the memory allocation memory region.

Referring to FIG. 8, a more detailed description of steps 204-210 of FIG. 4 will be discussed. The NtAllocateVirtualMemory hook is used to provide support for randomizing arbitrary memory allocations 26, such as a stack 20, heap 22, and other allocations achieved through the use of VirtualAlloc and NtAllocateVirtualMemory directly. At decision point 600, ASLR system 10 determines whether the PreviousMode is in UserMode? If so, then at step 602 ProbeforWrite BaseAddress and RegionSize. Steps 600 and 602 are required in order to ensure that the output parameters are valid such that an attacker 6 cannot lead to a Windows operating system 10 crash by specifying invalid parameters. Once completed, then at decision point 604 the ASLR system 10 determines whether the BaseAddress is zero. If the PreviousMode is not in UserMode, then the system 10 proceeds to decision point 604 in order to determine whether the base address is zero.

If the BaseAddress is zero, then the ASLR system 10 proceeds to decision point 606 in order to determine whether randomization has been completed. However, if the BaseAddress is not zero then the system 10 proceeds to step 622 for calling an original NtAllocateVirtualMemory.

At decision point 606, if randomization has been enabled, then the ASLR system 10 proceeds to step 608 in order to get a process object 9 from the handle that was passed to NtAllocateVirtualMemory before reaching decision point 612 in order to determine whether the process 9 is exempt from randomization. However, if randomization has not been enabled, then the ASLR system 10 proceeds to step 622 as described above.

At decision point 612, if the thread 13 has not been exempt from randomization, then a subroutine 610 is executed for a GetRandomizedBaseforProcess application before proceeding to decision point 614 in order to determine whether the randomized base is zero. However, if the thread 9 is exempt from randomization, then the ASLR system 10 proceeds to step 622 as described above.

At decision point 614, if the randomized base is zero, then at step 616 the ASLR system 10 sets ZeroBits to 0 before proceeding to decision point 618 in order to determine whether the AllocationType I=MEM_COMMIT. If the AllocationType I=MEM_COMMIT, then the AllocationType is set at I=MEM_RESERVE at step 620 before proceeding to step 622 as described above. However, if the AllocationType is not set at MEM_COMMIT then the ASLR system 10 proceeds directly to step 622.

After step 622 is executed, then the ASLR system 10 proceeds to decision point 624 in order to determine whether the Allocation was successful. If the Allocation was successful, then the Return status code is executed at step 630. However, if the Allocation failed, then the ASLR system 10 proceeds to step 626 in order to Restore ZeroBits, BaseAddress, and AllocationType. This is done in order to allow the allocation to succeed even if the ASLR system 10 was unable to allocate memory 7 at the randomized base address. After the parameter values are restored the operation completes by calling the original NtAllocateVirtualMemory at step 628. Once completed, the ASLR system 10 proceeds to step 630 as described above. In one implementation, if the allocation failed after randomization, the ALRS system 10 may try the allocation again without any randomized base address this time.

A more detailed discussion of this particular implementation of ASLR System 10 may be found in the related provisional patent application previously incorporated by reference.

Implementation of ASLR System for Randomizing a TEB and PEB

The TEB 32 and PEB 34 are both internal data structures that are used by both the process 9 and the Windows platform 8 to track the state of execution of process 9 in a globally accessible location. Since the TEB 32 and PEB 34 are internal data structures, the procedure involved in mapping the TEB 32 and PEB 34 into the address space 16 of thread 9 is handled by the kernel, for example by ntosknrl.exe. In addition, the implementation of ASLR system 10 used to randomize the TEB 32 and PEB 34 takes advantage of the fact that both memory regions 18 rely on the field nt!MmHighestUserAddress when these types of memory regions 18 are being mapped into memory 7. As such, adjusting nt!MmHighestUserAddress by a random number of pages makes it possible to make the address at which the TEB 32 and PEB 34 will be mapped to be random. The adjustment cannot exceed a value that causes nt!MmHighestUserAddress to fall below 0x7ffefff, however, due to the fact that this would make required portions of the user-mode address space unavailable to the process.

Figure 5:
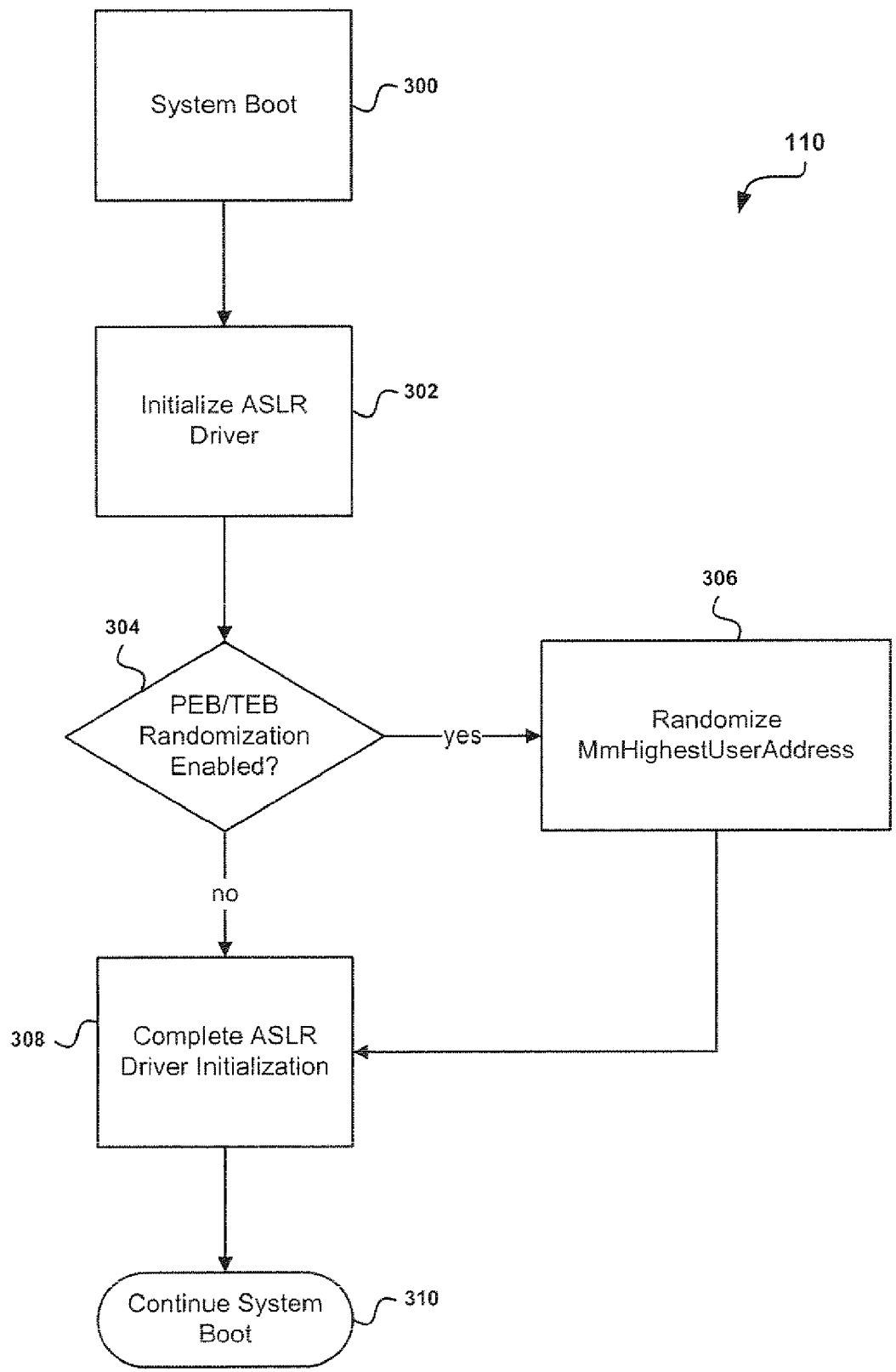
FIG. 5 is a flow chart illustrating another implementation of the ASLR system related to a PEB or TEB memory region.

Referring to FIG. 5, the subroutine 120 for randomizing either the TEB 32 or PEB 34 is illustrated. At step 300, ASLR system 10 is booted followed by step 302 wherein the ASLR Driver (not shown) is initialized. After the ASLR Driver is initialized, ASLR system 10 proceeds to decision point 304 to determine whether the PEB 34 and TEB 32 is enabled. If the PEB 34 and TEB 32 is enabled, then at step 306 the value of nt!MmHighestUserAddress is adjusted in order to modify the locations of the PEB 34 and TEB 32 of memory region 18. This field is randomized by a small degree such that allocations will occur at different offsets relative to the top of the user-mode address space 16. After step 306, the ASLR system 10 proceeds to step 308 and ASLR Driver initialization is completed.

However, if the PEB 34 and TEB 32 are not enabled at decision point 304, then the ASLR system 10 proceeds directly to step 308 for completing the ASLR Driver initialization. After step 308 is completed, the ASLR system 10 proceeds to step 310 in order to continue the system boot.

A more detailed discussion of this particular implementation of ASLR System 10 may be found in the related provisional patent application previously incorporated by reference.

Implementation of ASLR System for Randomizing Image Mappings

File mappings 14 can be typically loaded at the same base address of the address space 16 from one execution of process 9 to another execution, thereby allowing an attacker 6 to assume that a given instruction, such as a jmp esp instruction, will exist at the same base address between multiple target machines 4. A base address as used herein is defined as a memory address serving as a reference point ("base") for other memory addresses.

Figure 6:
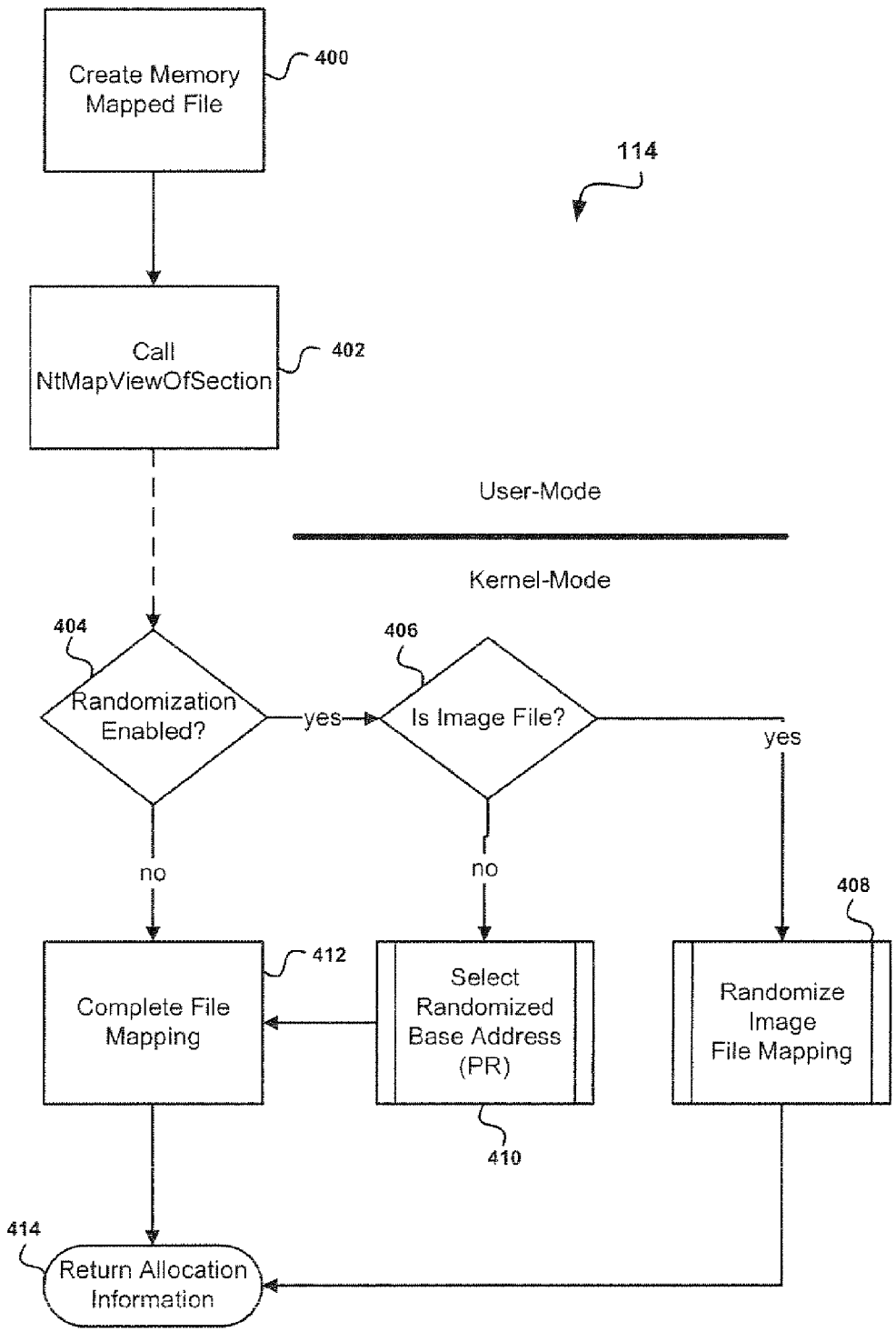
FIG. 6 is a flow chart illustrating an overview of another implementation of the ASLR system related to file mapping memory region.

In one implementation, ASLR system 10 provides a means for randomizing a file mapping 14 such that the file mapping 14 is not loaded at the same base address of space address 16 that prevents exploitation of any software vulnerability by the attacker 6. Referring to FIG. 6, the subroutine 114 for randomizing the memory mapped file 24 is illustrated. In the user-mode, at step 400, a memory mapped file 24 is created. Upon creation, Ntdll!NtMapViewOfSection calls into a kernel (not shown) which is handled by nt!NtMapViewOfSection. The ASLR driver (not shown) hooks the kernel's default implementation of nt!NtMapViewOfSection so that randomization may be introduced as the ASLR system 10 enters the kernel-mode. At decision point 404, the ASLR system 10 determines whether randomization has been enabled. If randomization has been enabled, the system 10 proceeds to decision point 406. If not, then the ASLR system 10 proceeds to step 412 for completing the file mapping 14 after which a return to allocation information is performed at step 414.

At decision point 406, the ASLR system 10 determines whether the memory region 18 is an image file or not. If the memory region 18 is an image file, then the ASLR system 10 executes subroutine 408 for randomizing the file mapping 14 and then proceeds to step 414.

However, if the ASLR system 10 determines that the memory region 18 is not an image file then system 10 proceeds to execute subroutine 410 that selects a randomized base address for address space 16. Once a randomized base address is selected, the ASLR system 10 proceeds to step 414.

Figure 9:
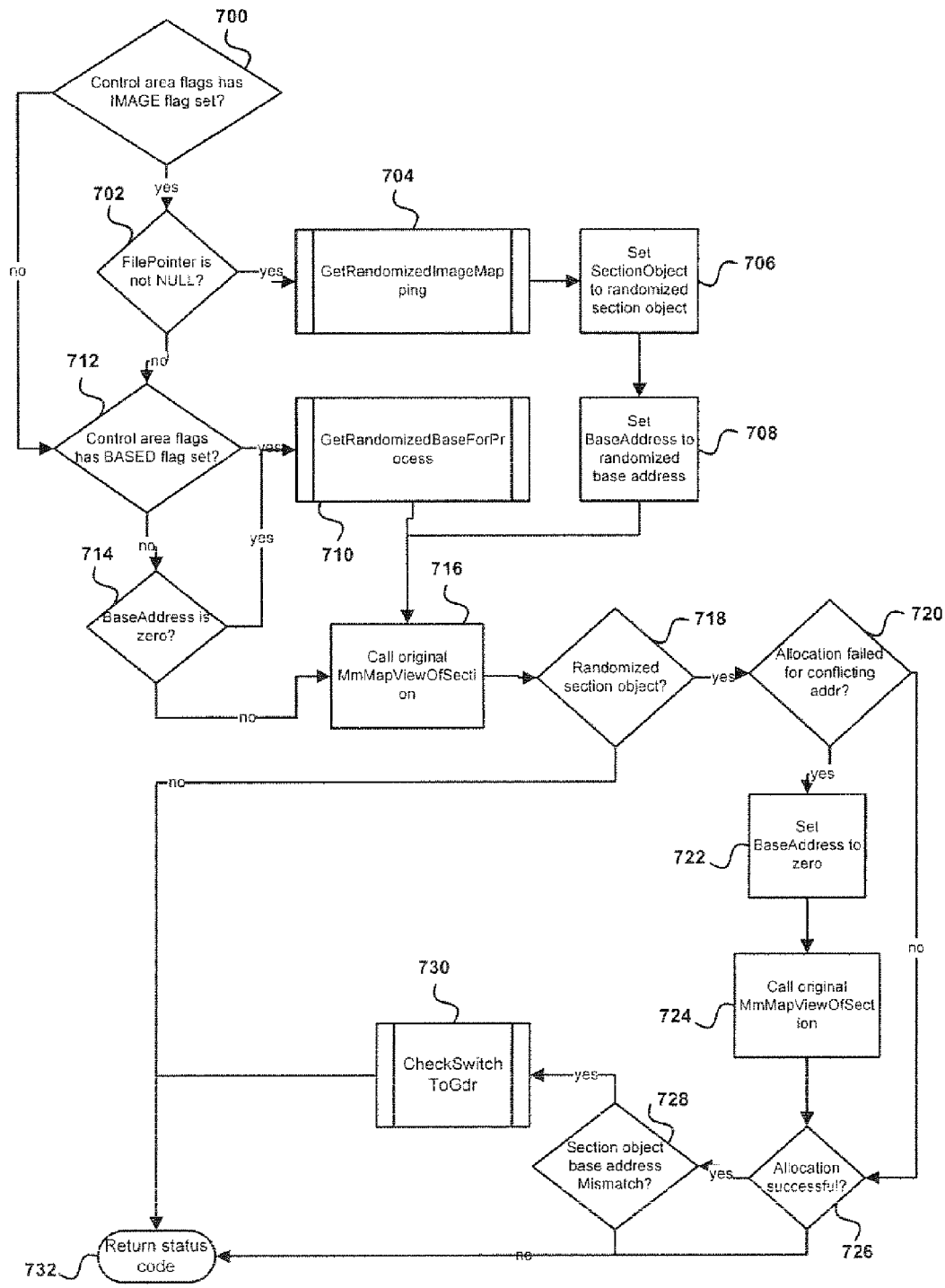
FIG. 9 is a flow chart illustrating another implementation of the ASLR system related to the file mapping and image file mapping memory regions of FIGS. 6 and 7, respectively.

A more detailed implementation of the ALRS system 10 embodied in steps 404-414 for the MmMapViewOfSection hook is illustrated in FIG. 9. At decision point 700 the ASLR system 10 determines whether the control area flags have an IMAGE flag set. If so, then at decision point 702 is reached to determine whether FilePointer is not NULL. If not, then ALSR system 10 proceeds directly to decision point 712 in order to determine whether the control area flags have the BASED flag set. These series of checks are used to determine if the file that is being mapped is an image file, and whether or not the file mapping is based, meaning that it should be loaded at a specific address.

At decision point 702, if the FilePointer is not NULL, then a subroutine 704 is executed for a GetRandomizedImageMapping application as shall be discussed in greater detail below. Once the subroutine 704 is completed, then at step 706 SectionObject to randomized section object is set before proceeding to step 708 so that the BaseAddress is set to a randomized base address. Afterwards, ASLR system 10 calls the original MmMapViewOfSection application at step 716.

If the FilePointer is NULL, then decision point 712 is reached to determine whether the control area flags have the BASED flag set or not. If the BASED flag is set, then subroutine 710 for implementing GetRandomBasedForProcess application is executed before reaching step 716 as described above. However, if the BASED flag is not set, then a decision point 714 is reached to determine whether the BaseAddress is zero or not. If the BaseAddress is zero, then subroutine 710 is executed as described above. If the BaseAddress is not zero, then the ASLR system 10 proceeds directly to step 716 as described above.

Once Call original MmMapViewOfSection is completed at step 716, then a decision 718 is reached in order to determine whether a section object is randomized. If the section is randomized, then a decision point 720 is reached to determine whether the allocation failed because of a conflicting address. However, if the section object is not randomized, then a Return status code is executed at step 732.

At decision point 720, if the allocation failed because of a conflicting address, then the BaseAddress is set to zero at step 722 followed by step 724 for calling the original MmMapViewOfSection. Once completed, decision point 726 is reached to determine whether the allocation was successful. If the allocation was successful, then decision point 728 is reached to determine whether the section object base address is a mismatch. This comparison is made between the base address returned by the call to the original MmMapViewOfSection and the base address conveyed by the section object itself. This check is necessary in order to determine the proper structure definitions to use for the operating system in question, for example the Windows platform 8. If there is a mismatch between the base addresses, then subroutine 730 is executed for a CheckSwitchtoGdr application followed by step 732 as described above. However, if the allocation is not successful then step 732 is executed.

Figure 10:
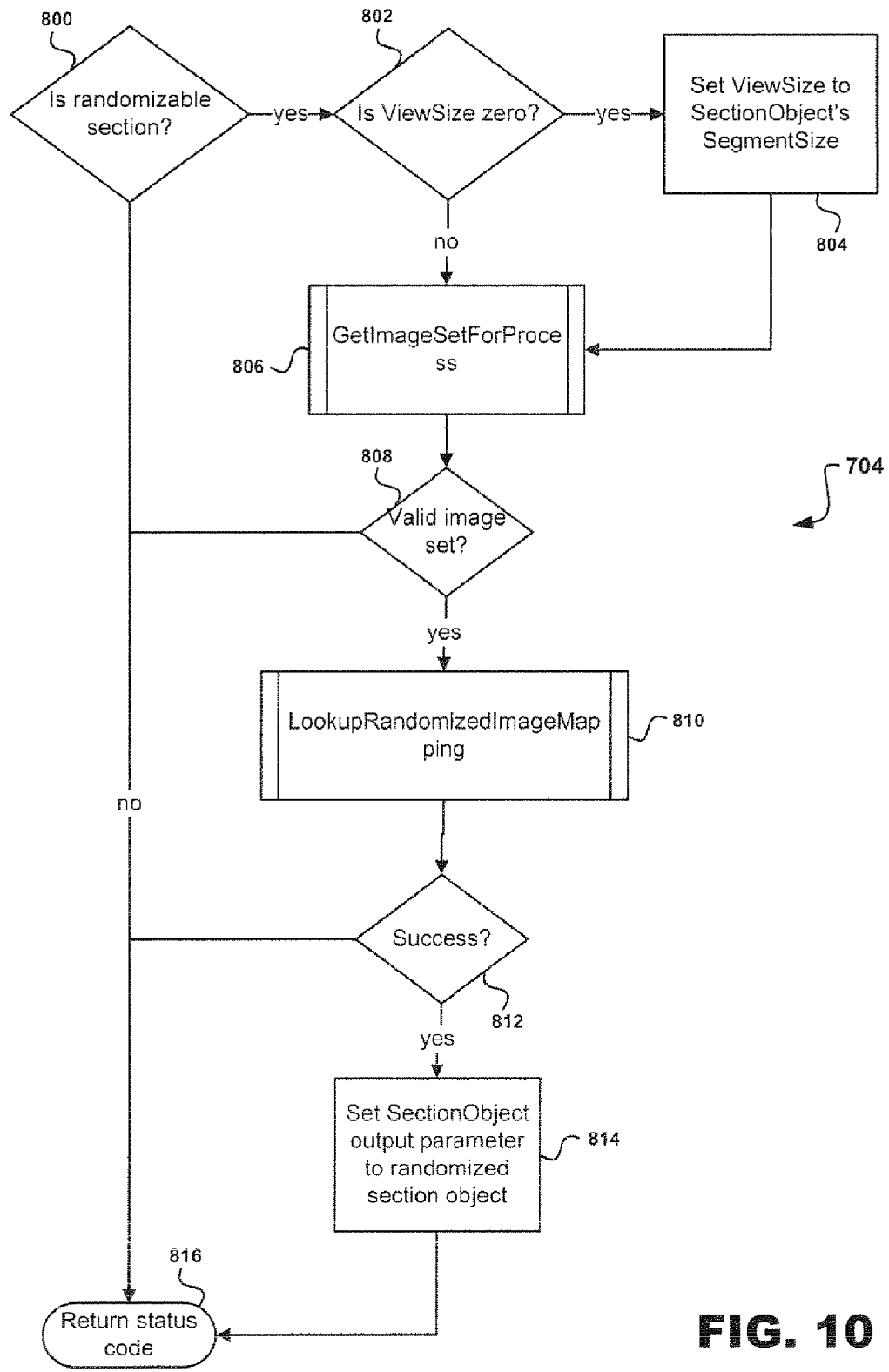
FIG. 10 is a flow chart illustrating a subroutine for the ASLR system of FIG. 9.

Referring to FIG. 10, subroutine 704 will be discussed in greater detail. At decision point 800 a determination is made on whether the section object is randomized. If the section object is randomized, then decision point 802 is reached to determine whether the ViewSize is zero or not. However, if the section object is not randomized, then the return status code at step 816 is executed.

At decision point 802, if the ViewSize is zero, then ViewSize is set to SectionObject's SegmentSize at step 804 followed by execution of subroutine 806. However, if the ViewSize is not zero, then the ASLR system 10 executes subroutine 806 for an GetImageSetForProcess application.

After completion of subroutine 806, then decision point 808 is reached for determining whether a valid image is set or not. If the valid image is set, then subroutine 810 for LookupRandomizedImageMapping application is executed. Once execution of subroutine 810 is completed, then decision point 812 is reached for determining whether subroutine 810 was successful or not. Decision point 812 is used to determine if a randomized image mapping was found for the file mapping that is currently being randomized. If successful, then at step 814 SectionObject output parameter is set to randomized section object before the return status code at step 816.

Figure 11:
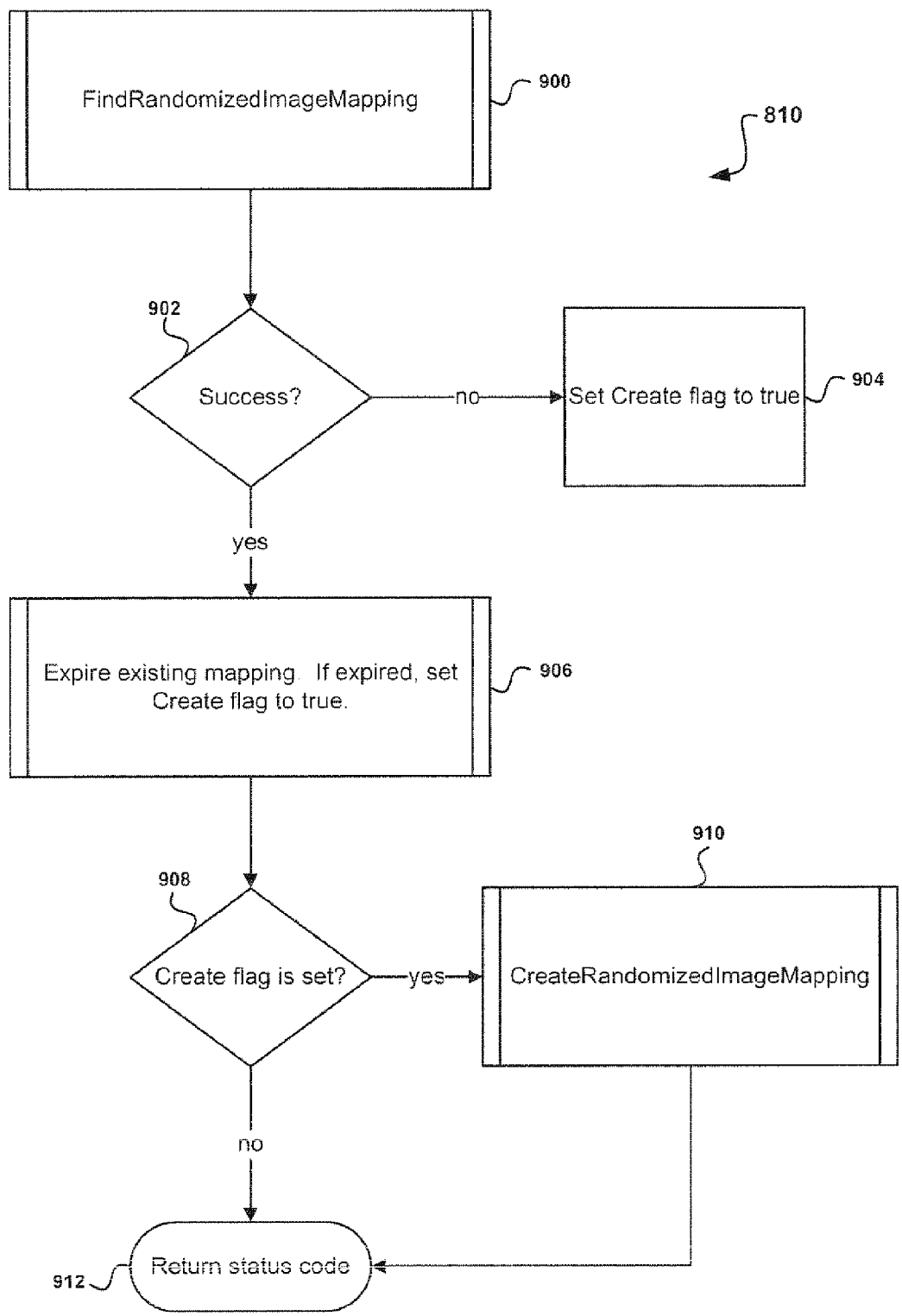
FIG. 11 is a flow chart illustrating a subroutine of the ASLR system of FIG. 10.

Referring to FIG. 11, subroutine 704 illustrated in FIG. 10 will be discussed in greater detail. At step 900, FindRandomizedImageMapping application is executed followed by decision point 902 in order to determine whether the FindRandomizedImageMapping application was successful. If successful, then the ASLR system 10 proceeds to step 904 to set Create Flag to true. However, if the FindRandomizedImageMapping application was not successful, then subroutine 906 is executed to expire existing mapping which, if expired, sets the Create Flag to true. However, if an existing randomized image set mapping for this section object, then a determination is made on whether the section object has been mapped at least once. If not, then the ASLR system 10 will expire the section object and create a new randomized image set mapping.

Once subroutine 906 is completed, the ASLR system 10 proceeds to decision point 908 to determine whether the Create Flag is set. If the Create Flag is set, then subroutine CreateRandomizedImageMapping application is executed followed by step 912 for return status code. However, if the Create Flag is not set, then the ASLR system 10 proceeds directly to step 912 as described above.

Figure 12:
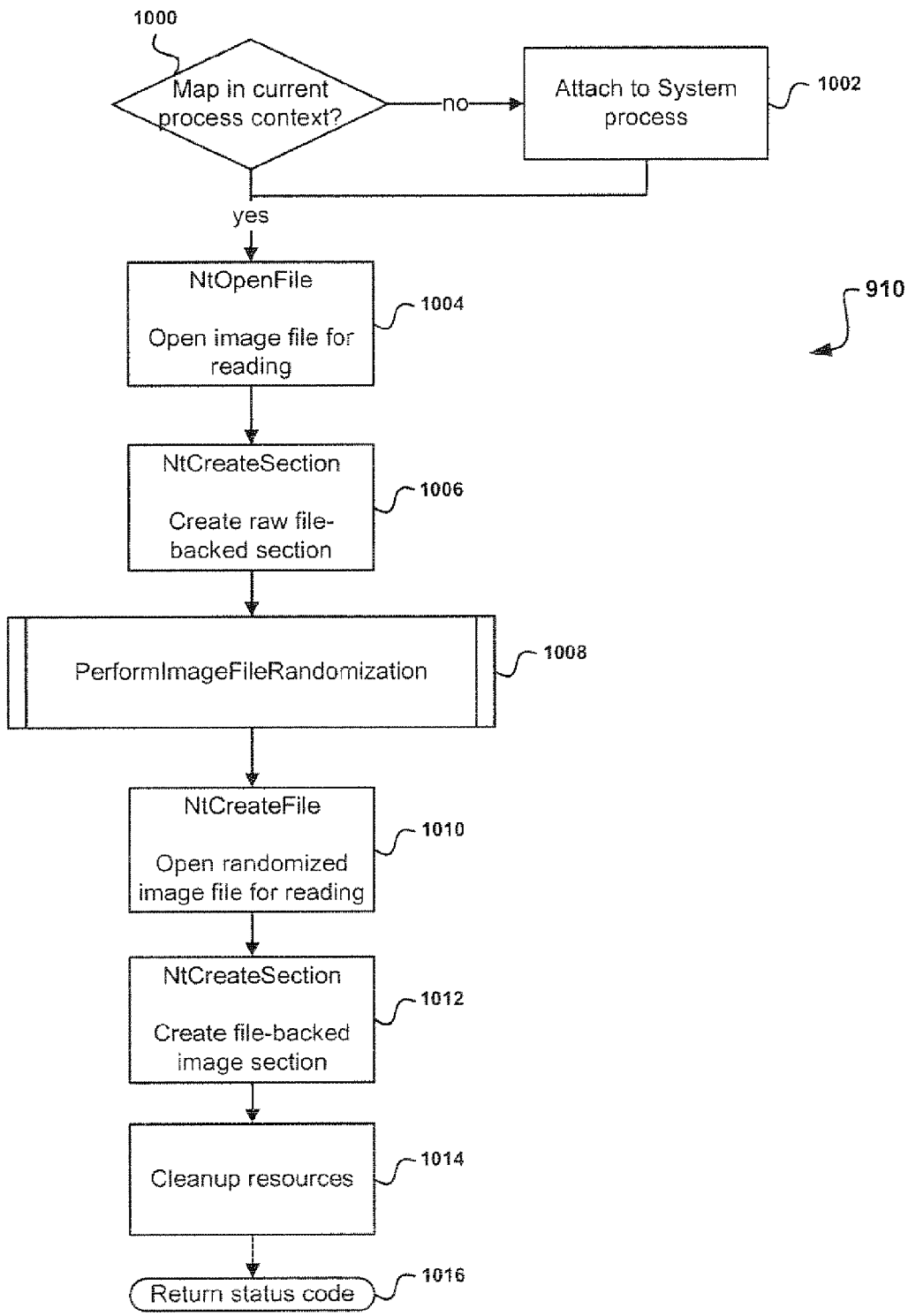
FIG. 12 is a flow chart illustrating a subroutine of the ASLR system of FIG. 11.

Referring to FIG. 12, subroutine 901 illustrated in FIG. 11 will be discussed in greater detail. At decision point 1000, the ASLR system 10 determines whether the map is in the current process context. This check is made to see if the image mapping should occur in the context of the calling process, where context is defined as the address space. If the map should not be performed in the current process context, then at step 1002, the ASLR system 10 attaches to system process followed by step 1004 which executes an NtOpenFile routine such that an image file 14 is opened for reading by the system 10. However, if the map is in the current process context, then the ASLR system 10 proceeds directly to step 1004.

After step 1004 is completed, the NtCreateSection routine is executed at step 1006 in order to create a raw file-backed section. The NtCreateSection routine allows the caller to create a new section object, such as a file-backed section or pagefile-backed section. In order to create a file-backed section the FileHandle parameter must point to a valid file handle with which to associate the section. Otherwise, the section will be created as a pagefile-backed section. In addition, the NtCreateSection allows the caller to create a named section object that can be subsequently accessed with NtOpenSection. The NtCreateSection routine can be accessed from user-mode through ntdll!NtCreateSection which is a stub for transferring control to the kernel-mode implementation that resides in nt!NtCreateSection. Once a raw file-backed section is created, a PerformImageFileRandomization subroutine 1008 is executed as shall be discussed in greater detail below.

After subroutine 1008 is executed, the NtCreateFile routine is executed at step 1010 in order to open a randomized image file for reading by the ASLR system 10 followed by step 1012. At step 1012, the NtCreateSection routine is executed for creating a file-backed image section. Once the file-backed image section is created, then at step 1014 resources are cleaned up followed by a return status code at step 1016, thereby completing subroutine 910. One subroutine 910 has completed, the current state will be such that a randomized section object has been created and returned that can be subsequently used to create a randomized image file mapping.

Figure 13:
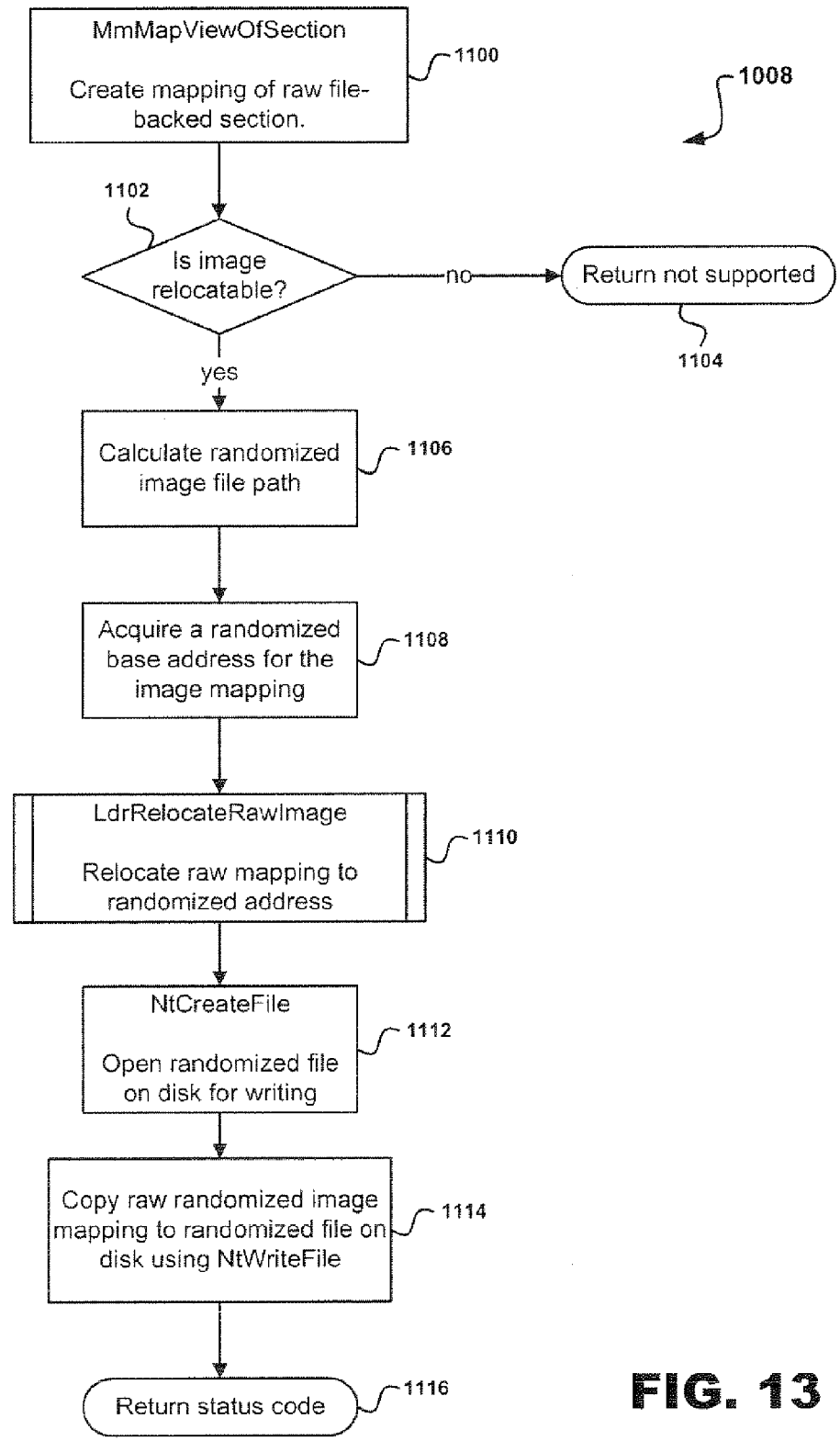
FIG. 13 is a flow chart illustrating a subroutine of the ASLR system of FIG. 12.

Referring to FIG. 13, subroutine 1008 illustrated in FIG. 12 will be discussed in greater detail. At step 1100, the MmMapViewOfSection routine is executed to create mapping of a raw file-backed section. This copy-on-write view routine is used to process relocations against the raw-on-disk version. The information derived from this routine will be subsequently saved to the randomized image file on disk. After the routine at step 1100 is executed, ASLR system 10 proceeds to decision point 1102 to determine whether the image is relocatable or not.

If the image is not relocatable, then the return is not support at step 1104 and the image cannot be efficiently randomized by using PE/COFF relocation information. Relocation information is information included in the binary itself that provides information necessary to change the base address at which an image file is located at on the fly. However, if the image is relocatable, then at step 1106 a randomized image file path is calculated. A unique path on disk must be calculated which will be used to store the randomized version of the image being filed.

At step 1108, a randomized base address for the image mapping is acquired followed by execution of LdrRelocateRawImage routine at step 1110. The base address acquired should not overlap with any other previously acquired image mapping address which will reduce the amount of memory overhead incurred due to copy-on-write relocations. The LdrRelocateRawImage routine relocates a raw mapping to a randomized address. Such relocations are applied to the raw mapping according to PC/COFF relocation standards.

After execution of the LdrRelocateRawImage routine is completed, then at step 1112 an NtCreateFile routine is executed for opening a randomized file on disk for writing. At step 1114, the raw randomized image mapping is copied to a randomized file on disk using the NtWriteFile routine. Once completed, the ASLR system 10 proceeds to return status code at step 1116, thereby completing subroutine 1008.

A more detailed discussion of the above may be found in the related provisional patent application previously incorporated by reference.

Implementation of ASLR System for Randomizing File Mappings

As noted above, file mappings 14, and particularly image file mappings 31, are generally regarded as one of the most relied upon memory types employed by an attacker when implementing to exploit against any type of software vulnerability. The reason for this type of software vulnerability is that image file mappings 31 may be typically loaded at the same base address from one execution to the next execution.

Figure 7:
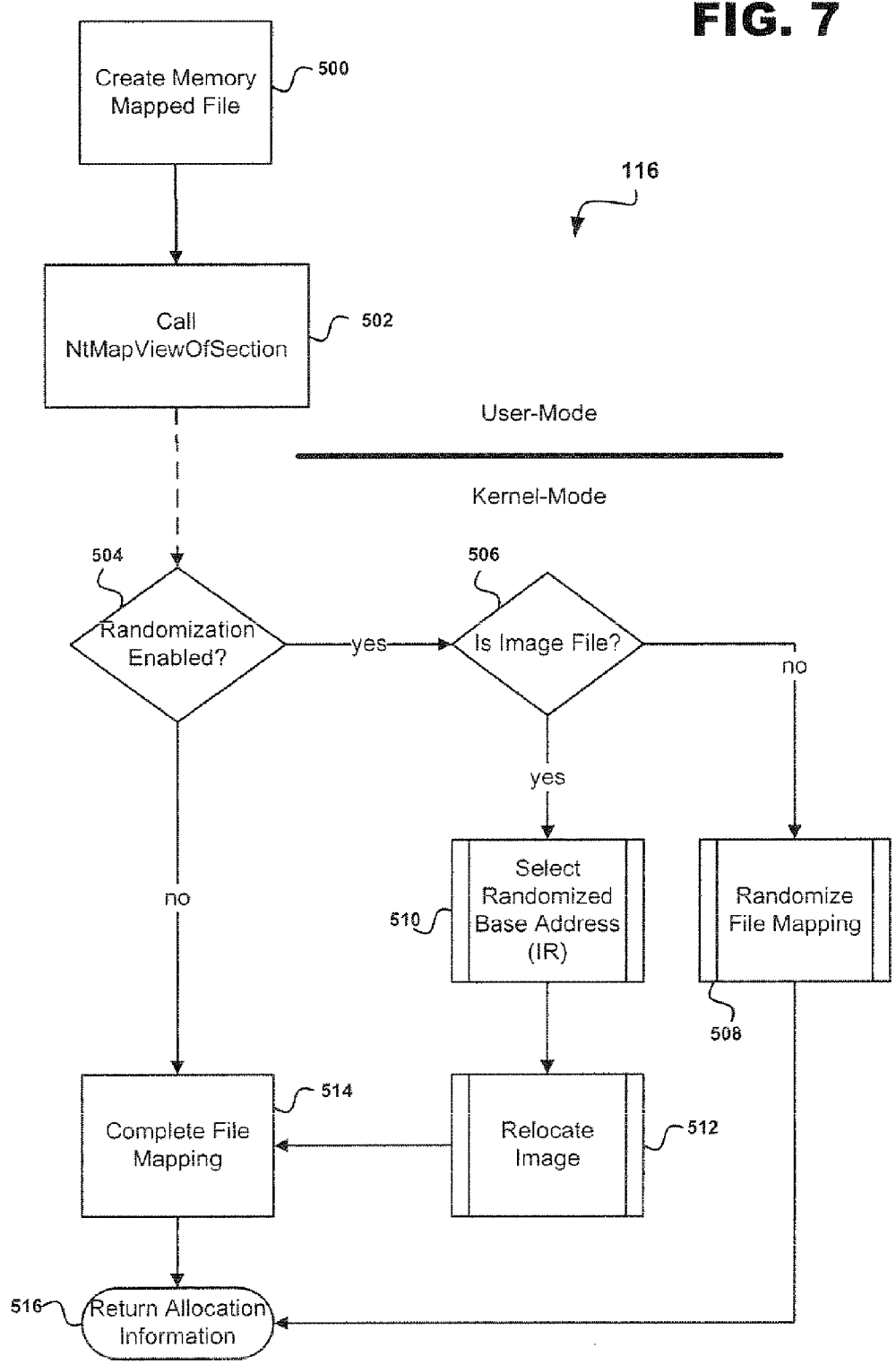
FIG. 7 is a flow chart illustrating an overview of the ASLR system of FIG. 4 related to the image file mapping memory region.

FIG. 7 provides an overview of a general implementation of the ASLR system 10 for randomizing the image file mappings 31. At step 500, a memory mapped file is created by the ASLR system 10 in a user-mode application. At step 502 the NtMapViewOfSection routine is called by ASLR system 10.

The NtMapViewOfSection routine accomplishes the task of mapping the physical pages described by a section (not shown) into the address space 16 of a given process 9. As used herein, the term section is defined as a data structure that holds information about a portion of memory 7 that is either backed against a file on a disk (referred to as "file-backed") or the pagefile (referred to as "pagefile-backed"). The physical pages described by the section are typically meant to be mapped into the address space 16 of one or more processes 9. Since a view of an individual section can exist in multiple processes 9 and the section itself describes only one set of physical pages, those physical pages are considered to be shared. If one process 9 were to map a view of a file-backed section object for write access and were to make a change, all other processes 9 with a view of the same area of the file on disk would be able to see the change.

The method by which the pages of a section are mapped into memory is dependent on both the parameters passed into a NtMapViewOfSection routine and on the parameters that were passed into the call to a NtCreateSection routine originally. The NtCreateSection routine allows the caller to create a new section object. As described above, there are two types of logical sections that can exist: file-backed sections and pagefile-backed sections. In order to create a file-backed section the FileHandle parameter must point to a valid file handle with which to associate the section. Otherwise, the section will be created as a pagefile-backed section.

Once step 502 is completed, the ASLR system 10 enters a kernel-mode application which proceeds to decision point 504 to determine whether randomization has been enabled. If randomization has been enabled, then ASLR system 10 proceeds to decision point 506 in order to determine whether the memory region 18 is an image file mapping 31. However, if randomization has not been enabled, then at step 514 a file mapping 14 is completed and ASLR system 10 proceeds to step 516 for return allocation information and the subroutine 116 is completed.

At decision point 506, if the memory region 18 is not an image file mapping 31, then a subroutine 508 is executed which randomizes the file mapping 14. Once randomization has been completed, the ASLR system 10 may proceed to step 516 and the subroutine 116 is completed. However, if the memory region 18 is an image file mapping 31, then subroutine 510 is executed which selects a randomized base address. After the base address has been randomized, a subroutine 512 is executed which relocates the image and then the file mapping 14 is completed at step 514. After step 514, the ASLR system 10 may proceed to step 516 and subroutine 116 is completed.

Implementation of SEH Overwrite Protection

One attack vector that is unique to the Windows platform is what is known as an SEH, or Structured Exception Handler, overwrite. This attack vector involves an attacker overwriting data structures that are stored on the stack which are used whenever an exception, such as an access violation, is dispatched. The act of dispatching an exception involves the kernel passing information about the exception that occurred to the thread that the exception occurred in. It does this by enumerating a list of registered exception handlers, all of which are stored on the thread stack. This gives the thread an opportunity to recover from the exception and continue executing.

If an attacker is able to use a stack overflow to overwrite a registered exception handler on the stack, then it is possible for that attacker to gain execution control. The protection mechanism described in this document establishes an algorithm that can be used to detect and prevent an attacker from being able to leverage an SEH overwrite. It accomplishes this by adding a security check to the exception dispatching process that ensures that all registered exception handlers are valid prior to allowing the operating system provided exception dispatcher to continue.

SEH overwrite protection functions by hooking a NtCreateThread routine in kernel-mode application. When NtCreateThread is called an APC is queued that executes code in the context of a thread 13, which installs a validation frame. The validation frame provides a marker and is placed at the tail end of the exception registration record list which is found within the NT_TIB structure and can be located at fs:[0].

To detect this marker, the user-mode exception dispatcher, KiUserExceptionDispatcher routine is hooked. When an exception is dispatched, the hook walks the exception registration record chain to make sure that the hook can reach the validation frame that was installed when the thread was created. If the validation frame cannot be reached, the hook assumes that the exception registration record list has been corrupted and that an exploitation of any software vulnerability is possible.

Figure 14:
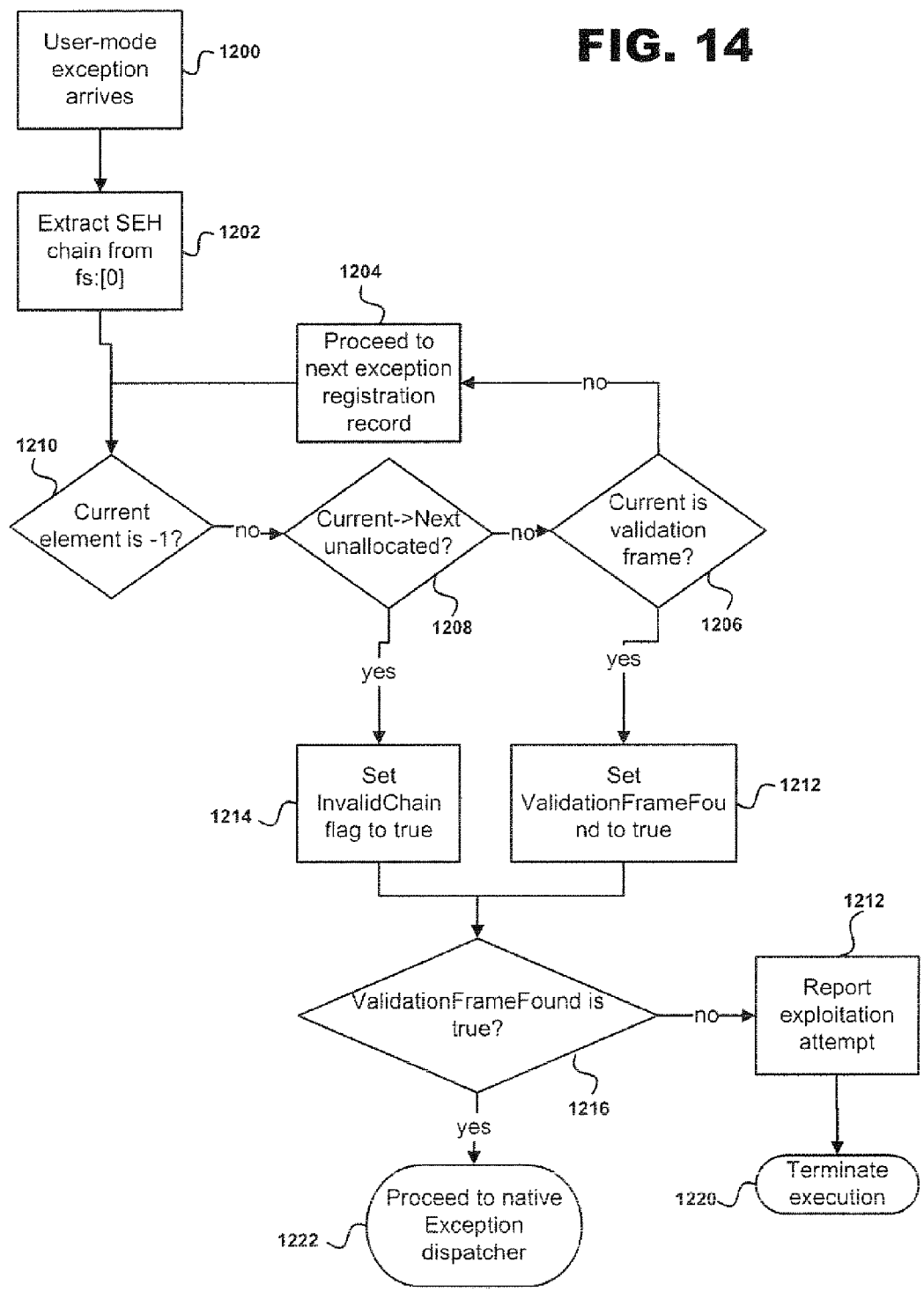
FIG. 14 is a flow chart illustrating a method of an SEH overwrite protection.

Referring to FIG. 14, at step 1200, the user-mode exception arrives through the kernel dispatching exception information and handing off that information to a thread. An SEH chain is then extracted from fs:[0] at step 1202 followed by decision point 1210 in order to determine whether the current element is −1 or not. The current element is defined as the current exception registration record in the exception handler list. If the current element is not −1, then decision point 1208 is reached to determine whether the current element is lower or equal to the next unallocated current element. If the current element is −1, then the decision point at 1216 is reached which will be described in detail. At decision point 1208, if the next element points to unallocated memory, then at step 1214 the InvalidChain flag is set to true. However, if the next element points to valid memory, then decision point 1212 is reached in order to determine whether the current element is a validation frame. If the current element is a validation frame then the ValidationFrameFound is set to true. However, if the current element is not a validation frame then the execution proceeds to 1204 which selects the next exception registration record from the chain. This cycle continues in a loop until one of the conditions results in execution reaching 1216.

Once either steps 1212 or 1214 are completed, then decision point 1216 is reached in order to determine whether the ValidationFrameFound is true. If the ValidationFrameFound is true, then the ASLR system 10 at step 1222 proceeds to native exception dispatcher. The native exception dispatcher will pass the exception information onto all of the registered exception handlers. This operation is safe to occur only after the validation frame has been found because it proves that the list of registered exception handlers has not been corrupted, such as what might occur as the result of a stack overflow. Step 1222 completes implementation for SEH overwrite protection. However, if the ValidationFrameFound is not true, then an exploitation attempt is reported at step 1218 followed by step 1220 which terminates execution of the procedure.

A more detailed discussion of the above may be found in the related provisional patent application previously incorporated by reference.

It should be understood from the foregoing that, while particular implementations have been illustrated and described, various modifications can be made thereto and are contemplated herein. It is also not intended that the invention be limited by the specific examples provided within the specification.

What is claimed is:

1. A computer readable storage medium encoded with routines executed by a computing device for providing overwrite protection during an exception dispatching process for a data structure stored in a memory of the computing device, wherein the computer device has a user-mode of operation and a kernel mode of operation, and wherein said data structure includes a list of registered exception handlers each comprising a list of registration records, and wherein exception information about a thread being executed on the computing device is dispatched during thread execution, the dispatched exception information being passed to each of the list of registered exception handlers including the list of registration records stored in the data structure, the computer readable media comprising:

a first routine executed by the computing device in the user mode of operation during the initialization of a thread for inserting a marker at the end of each the list of registration records stored in the data structure; and a second routine executed by the computing device during the user mode in response to the executed exception dispatching process for searching each of the list of registration records to detect the marker, wherein continued execution of the thread is determined as a function of whether the marker is detected.

2. The computer readable medium of claim 1, wherein executing the first routine includes installing a validation frame to insert the marker at the end of the list of exception registration records, and wherein the second routine includes hooking a user-mode exception dispatcher to inspect each of the exception handler lists to detect the marker prior to allowing exceptions to be dispatched.

3. The computer readable medium of claim 2 wherein the hooking includes stepping through the list of exception registration records to verify that the validation frame can be reached.

4. The computer readable medium of claim 1, wherein the executable routines provide structured exception handler (SEH) overwrite protection.

5. The computer readable medium of claim 1, wherein execution of the thread is terminated when the marker cannot be detected, and wherein execution of the thread continues when the marker is detected.

6. The computer readable medium of claim 1, wherein the first routine is executed in the user mode of operation during the initialization of a thread for inserting a marker at the end of each the list of registration records stored in the data structure, or wherein the first routine is executed in the kernel mode of operation during the initialization of a thread for inserting a marker at the end of each the list of registration records stored in the data structure.

7. A system for providing overwrite protection during an exception dispatching process for a data structure, the system comprising:
 a memory comprising the data structure;
 a computing device comprising:
  a user-mode of operation and a kernel mode of operation, wherein the data structure includes a list of registered exception handlers each comprising a list of registration records, and wherein exception information about a thread being executed on the computing device is dispatched during thread execution, the dispatched exception information being passed to each of the list of registered exception handlers including the list of registration records stored in the data structure; and
  routines executable by the computing device, the routines comprising:
   a first routine executed by the computing device in the user mode of operation during the initialization of a thread for inserting a marker at the end of each the list of registration records stored in the data structure; and
   a second routine executed by the computing device during the user mode in response to the executed exception dispatching process for searching each of the list of registration records to detect the marker, wherein continued execution of the thread is determined as a function of whether the marker is detected.

8. The system of claim 7, wherein executing the first routine includes installing a validation frame to insert the marker at the end of the list of exception registration records, and wherein the second routine includes hooking a user-mode exception dispatcher to inspect each of the exception handler lists to detect the marker prior to allowing exceptions to be dispatched.

9. The system of claim 8 wherein the hooking includes stepping through the list of exception registration records to verify that the validation frame can be reached.

10. The system of claim 7, wherein the executable routines provide structured exception handler (SEH) overwrite protection.

11. The system of claim 7, wherein execution of the thread is terminated when the marker cannot be detected, and wherein execution of the thread continues when the marker is detected.

12. The system of claim 7, wherein the first routine is executed in the user mode of operation during the initialization of a thread for inserting a marker at the end of each the list of registration records stored in the data structure, or wherein the first routine is executed in the kernel mode of operation during the initialization of a thread for inserting a marker at the end of each the list of registration records stored in the data structure.

13. A method for providing overwrite protection during an exception dispatching process for a data structure stored in a memory of a computing device, wherein the computer device has a user-mode of operation and a kernel mode of operation, and wherein said data structure includes a list of registered exception handlers each comprising a list of registration records, and wherein exception information about a thread being executed on the computing device is dispatched during thread execution, the dispatched exception information being passed to each of the list of registered exception handlers including the list of registration records stored in the data structure, the computer readable media comprising:
 inserting a marker at the end of each the list of registration records stored in the data structure during the initialization of a thread when the computing device is in the user mode of operation; and
 searching each of the list of registration records to detect the marker during the user mode in response to the executed exception dispatching process; and
 determining whether to continue execution of the thread is based on whether the marker is detected.

14. The method of claim 13 further comprising:
 installing a validation frame to insert the marker at the end of the list of exception registration records; and
 hooking a user-mode exception dispatcher to inspect each of the exception handler lists to detect the marker prior to allowing exceptions to be dispatched.

15. The method of claim 14 wherein hooking includes stepping through the list of exception registration records to verify that the validation frame can be reached.

16. The method of claim 13, wherein the executable routines provide structured exception handler (SEH) overwrite protection.

17. The method of claim 13, wherein execution of the thread is terminated when the marker cannot be detected, and wherein execution of the thread continues when the marker is detected.

18. The method of claim 13, wherein the first routine is executed in the user mode of operation during the initialization of a thread for inserting a marker at the end of each the list of registration records stored in the data structure, or wherein the first routine is executed in the kernel mode of operation during the initialization of a thread for inserting a marker at the end of each the list of registration records stored in the data structure.

19. A method for providing overwrite protection during an exception dispatching process for a data structure stored in a memory of a computing device, wherein the computer device has a user-mode of operation and a kernel mode of operation, and wherein said data structure includes a list of registered exception handlers each comprising a list of registration records, and wherein exception information about a thread being executed on the computing device is dispatched during thread execution, the dispatched exception information being passed to each of the list of registered exception handlers including the list of registration records stored in the data structure, the computer readable media comprising:

inserting a marker at the end of each the list of registration records stored in the data structure during the initialization of a thread when the computing device is in the user mode of operation; and searching each of the list of registration records to detect the marker during the user mode in response to the executed exception dispatching process;

terminating execution of the thread when the marker cannot be detected; and continuing execution of the thread when the marker is detected.

\* \* \* \* \*